United States Patent Office 2,844,416
Patented July 22, 1958

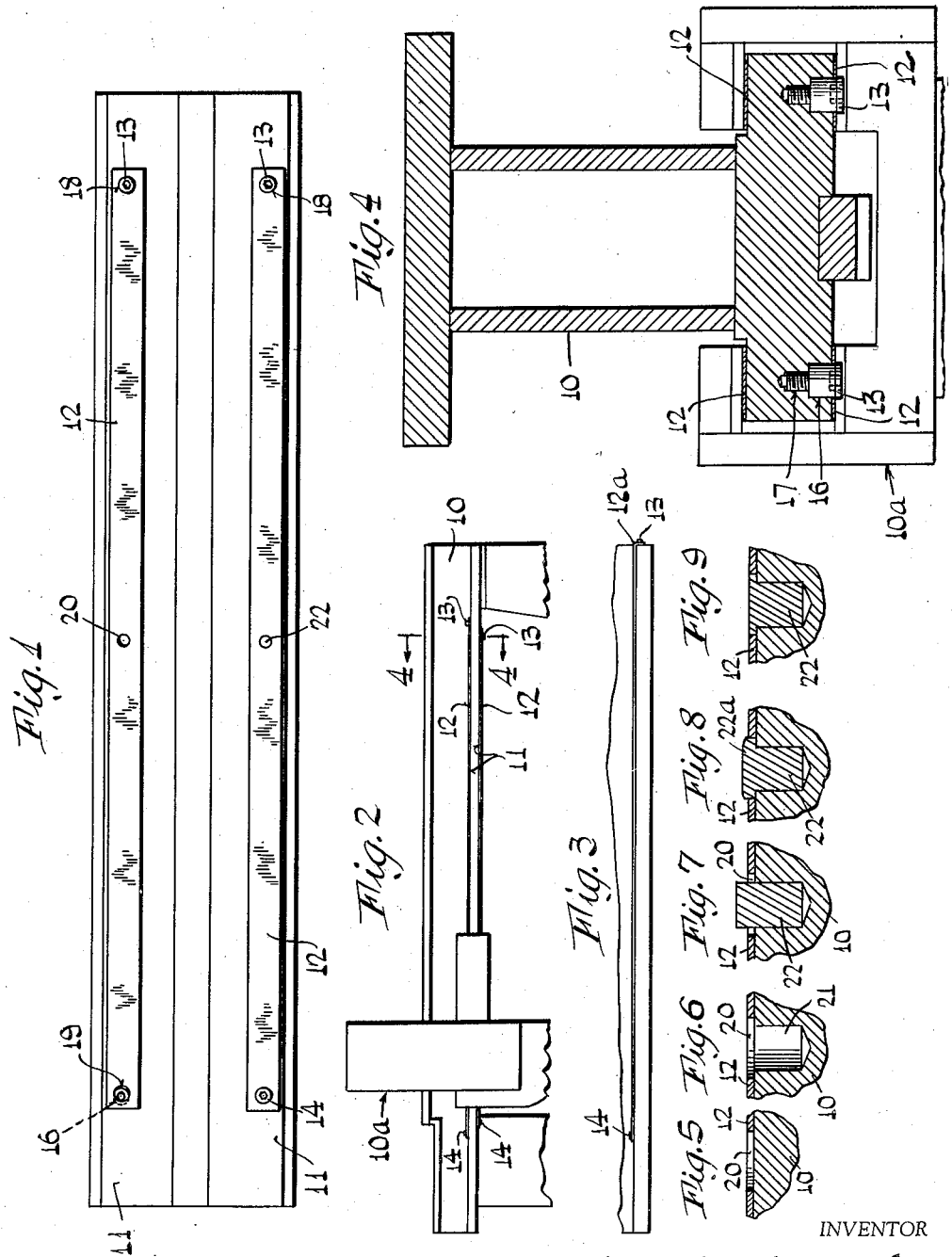

2,844,416

BEARING MEANS AND METHOD OF MAKING SAME

Victor A. Zaveruha, Trumbull, Conn., assignor to The Coulter & McKenzie Machine Co., Inc., Bridgeport, Conn., a corporation of Connecticut Application June 28, 1954, Serial No. 439,715

9 Claims. (Cl. 308—3)

The present invention relates to bearings or machine ways having thin strip-like wear-resistant liners and to the method of producing the same.

Heretofore, when hardened liners have been provided on ways, they have been expensive due to the cost of the material required and have presented a problem in that if long liners were employed, a danger was always present of the heat treating, in hardening the liners, causing warping of the liners and requiring substantial machining and grinding operations to provide a smooth, true surface.

To avoid this, it has been proposed to supply the liners in short sections. While this reduced the tendency to warp, it injected the additional problems of lining up and accurately positioning and securing a plurality of sections so as to provide a continuous bearing surface. Furthermore, in both of the above cases, when it was necessary to replace the liner as when wear occurred therein, it required a long down time for the machine to remove and install new or reconditioned liners.

The present invention overcomes these difficulties by providing a simple, relatively inexpensive and effective lined way or bearing and the method of making the same whereby the liner can be readily installed without machining thereof and can be quickly and easily replaced.

This is accomplished by providing a base with a smooth bed and securing thereto a thin, flat, hardened strip of metallic material, which strip is under longitudinal tension and drawn into tight engagement with the bed.

In carrying out the novel method of the present invention, the base is formed with a smooth surface or bed which is then provided with holes adjacent the ends and beyond the active bearing portion, and a liner of thin, hardened strip material, preferably blue spring steel, of a length substantially equal to the bed is provided with holes adjacent the ends which are spaced apart a distance less than the distance between the holes in the bed. The thin liner then is readily warmed by suitable means to expand the same. When it has expanded sufficiently so that the holes in the liner coincide with the holes in the bed, fastening means are inserted through the aligned holes and thereafter the liner is cooled. As the liner cools, it contracts and becomes stretched between the fastening means, is longitudinally tensioned and is drawn into flat engagement with the bed. When it is desired to replace the liner, it is merely necessary to warm the liner and expand it until the tension is removed, whereupon the liner may be readily slipped off the holding means and a replacement liner applied in the manner just explained.

If desired, lateral stabilizing means can be provided for extremely long ways after the liner has been secured to prevent lateral shifting of the liner on the bed.

The features of the invention reside in the fact that liner material of the strip type is less expensive than the heavy hardened liners heretofore employed, it can be provided in any length as required, it can be installed without requiring accurate machining of the hardened bearing surface, and it can be quickly and accurately installed and/or replaced as required.

Other features and advantages of the invention will be apparent from the specification and claims when considered in connection with the drawings in which:

Figure 1 is a bottom view showing bearing means of the present invention.

Fig. 2 is a side view of a frame having the bearing thereon.

Fig. 3 is a detailed view of another bearing of the present invention.

Fig. 4 is a detail section taken along line 4—4 of Fig. 2.

Figs. 5 to 9 show the steps of forming the stabilizing means.

While the present invention may be employed in bearing devices of various types, it is herein illustrated as providing hard, wear-resisting surfaces on the ways of a machine frame 10 for supporting a carriage 10a for movement thereover.

As shown in the drawings, the frame or base 10 is provided with a smooth bed 11 adapted to receive thin, strip-like wear-resistant liners 12. While the liners may be made of strips of various wear-resistant materials, it is at present preferred to use strips of hardened blue spring steel. This material is readily available in continuous lengths and has a smooth, hard, flat surface. The liner is longitudinally tensioned and secured to the base by fastening elements or pins 13, 14. These fastening elements as shown in Fig. 4 extend into holes 16 and have their inner ends in threaded engagement with the tapped bottom 17 of the hole, with the outer ends extending through holes 18, 19 punched in the liner adjacent the ends thereof. The thin liner, which can be in the range of approximately one-sixteenth inch in thickness, can extend for any desired length and can be readily secured in place so that it provides a relatively simple, yet satisfactory bearing.

In a construction, such as shown in Fig. 3 where it is desired to remove the carriage or other member sliding on the ways from the end of the machine, the end 12a of the liner can be extended over the end of the frame and have the fastening element 14 pass through the hole in the liner and into the end of the frame so as not to interfere with the movement of the carriage.

In cases where the liner extends for long distances, it may be desired to provide stabilizing means intermediate the ends thereof. While this may take many forms, in the illustrated form of the invention this means comprises providing a hole 20 in the liner intermediate the ends and having a pin 21 passing through the liner and into the bed, with the top of the pin headed over and smoothed off so as not to interfere with the carriage moving over the ways.

In accordance with the novel method of applying the liner to the way to form the bearing structure, the base 10 has its surfaces smoothed off by machining or the like to provide the beds 11 for the liner. This can be readily accomplished since the base is usually of relatively soft material and can be easily machined to provide the flat supporting surface to receive the liner. Each end of the bed beyond that portion which is to be operative as a way is provided with the holes 16 with their inner ends tapped at 17 to receive the fastening means or pins 13, 14. The liners are cut from a roll of spring steel to the desired length to extend over the bed and have the holes 18, 19 punched therein, which holes have their centers spaced apart a distance less than the centers of the holes 16 in the bed.

While the liners can be heated and thereafter applied to the bed in the method illustrated in Fig. 1, wherein the upper liner is in position to be secured to the bed, it has the hole 18 at one end in position around the pin 13. It will be noted that the hole 19 at the other end of the liner is offset from the hole 16 in the bed. The thin liner is then easily heated or warmed in any suitable manner so as to expand the same longitudinally, without interfering with the hardness thereof, until the hole 19 in the liner coincides with the hole 16 in the bed, whereupon the other fastening element or pin 14 is inserted through the aligned holes and threaded into the bed to hold the liner to the bed in the manner shown in the lower way of Fig. 1. As the liner cools off, it tends to return to its initial length but inasmuch as it is held by the fastening pins, it becomes longitudinally tensioned or stretched between the fastening pins and drawn down into a tight, flat relation with the bed.

When the stabilizing means is required, the liner has an auxiliary hole 20 punched therein intermediate the ends at the same time the holes 18, 19 are formed. After the liner has cooled and returned to its stretched position, the hole will overlie the bed, as shown in Fig. 5. A hole 21 is then drilled into the bed through the hole in the liner, which hole 21 has a slightly smaller diameter than the hole in the liner. A pin 22 of malleable material, such as brass, is inserted into the hole 21 in the bed through the hole 20 in the liner, as shown in Fig. 7, and is headed over as indicated at 22a in Fig. 8, to interlock with the hole 21 in the liner, after which the excess metal is smoothed off as shown in Fig. 9. This provides a satisfactory interlock to prevent the liners from lateral movement.

In mounting the liner of the type shown in Fig. 3, the liner is first bent to provide the depending portion 12a which contains the hole 18 for receiving the fastener 13. After this end of the liner is in position, the remainder of the liner is heated and expanded until the hole 19 in the other end overlies the hole 16 in the bed, whereupon the fastening 14 is inserted, after which the liner cools and becomes tensioned in the manner described above.

With the present invention it will be seen that a simple and efficient bearing or way is provided which eliminates the necessity of costly machining operations on the hardened parts, which lining material is readily available and, being thin, is less expensive than the blocks heretofore used, and which liners can be extended for any desired length without injecting any problem heretofore encountered in the heat treating of the liner members.

Furthermore, it will be seen that when it is desired to replace the liner, it is merely necessary to heat the liner and cause it to expand, slip it off the pins and replace it with another liner of similar construction, all of which can be accomplished quickly and with a minimum of downtime of the machine.

Variations and modifications may be made within the scope of the claims and portions of the improvements may be used without others.

I claim:

1. In a way or bearing, a continuous base, a hardened liner engaging and extending over the base for the full length of the liner, said liner comprising a flat, thin strip of hardened metallic material under longitudinal tension, and means passing through the liner and into the base and securing the tensioned liner to the base.

2. In a way or bearing, a continuous base, a hardened liner engaging and extending over the base for the full length of the liner, said liner comprising a thin strip of spring steel under longitudinal tension, and means passing through the liner and into the base and securing the tensioned liner to the base.

3. In a way or bearing, a base having a smooth, continuous liner-receiving surface, a hardened liner extending over the surface, said liner comprising a flat, thin strip of spring steel under longitudinal tension, and means passing through the liner and into the base and securing the tensioned liner to the base in engagement with said surface.

4. In a way or bearing, a continuous base having a smooth liner-receiving surface provided with spaced holes therein, a liner comprising a thin strip of hardened metallic material having holes therein normally spaced apart a distance less than the holes in the base, and securing means passing through the holes in the strip and into the holes in the base and stretching the strip therebetween to provide longitudinal tension in the strip and cause the strip to lie in engagement with the smooth surface on the base.

5. In a way or bearing, an elongate base having a liner-receiving surface provided with spaced holes therein, a hardened liner extending over the base, said liner comprising a thin strip of hardened material under longitudinal tension, means passing through the liner adjacent the ends thereof and into the base and securing the tensioned liner to the base, and means intermediate the ends of the liner for interlocking the strip to the base to hold the strip against lateral movement.

6. In the method of providing a hard liner for a bearing surface, the steps of preparing a base surface to provide a smooth bed with strip holding means beyond the operative portion of the bearing surface; forming a thin strip of wear-resistant material a length to overlie said base with anchoring means, cooperating with the holding means on the base, having a spacing therebetween of less than the spacing between the strip holding means on the base; warming the strip to expand the same until the anchoring means in the strip move into cooperative relation with the holding means in the base and then securing the anchoring means thereto; and cooling the strip to cause the strip to be longitudinally tensioned between the holding means and drawn flat and into firm engagement with said base.

7. In the method of providing a hard liner for a bearing surface, the steps of preparing a base surface to provide a smooth bed with pin-receiving holes adjacent the ends thereof, forming a spring steel strip of a length to overlie said base and with holes having a spacing between the centers thereof less than the spacing between centers of the holes in the base, warming the strip to expand the same until the holes in the strip coincide with the holes in the base, inserting holding pins into the aligned holes, and cooling the strip to cause the strip to be longitudinally tensioned and drawn flat and into firm engagement with said base.

8. In the method of providing a hard liner for a bearing surface, the steps of preparing a base surface to provide a smooth bed with fastening member receiving holes adjacent the ends thereof, forming a thin strip of a wear-resistant material with a length to overlie said base with holes having a spacing between the centers thereof less than the spacing between centers of the holes in the base, placing the hole over a fastening member mounted in a hole in the bed, warming the strip to expand the same until the other hole in the strip is aligned with the other hole in the bed, inserting a fastening member into the aligned holes, and cooling the strip to cause the strip to be stretched between the members and drawn flat and into firm engagement with said base.

9. In the method of providing a hard liner for a bearing surface, the steps of preparing an elongate base surface to provide a smooth bed for the liner with pin-receiving holes adjacent the ends thereof, forming a thin hardened metallic strip of a length to overlie said base with holes having a spacing between the centers thereof less than the spacing between centers of the holes in the base, warming the strip to expand the same until the holes in the strip coincide with the holes in the base, inserting holding pins into the aligned holes, cooling the strip to cause the strip to be longitudinally tensioned and drawn flat and into firm engagement with said base, and thereafter interlocking the liner and base intermediate the ends to prevent lateral movement of the liner on the base.

References Cited in the file of this patent

UNITED STATES PATENTS

| | | |
|---|---|---|
| 1,193,238 | Cook | Aug. 1, 1916 |
| 1,245,324 | Droitcour | Nov. 6, 1917 |
| 1,575,609 | Allan | Mar. 9, 1926 |
| 1,770,932 | Leake | July 22, 1930 |
| 2,039,398 | Dye | May 5, 1936 |
| 2,050,960 | Olivetti | Aug. 11, 1936 |